United States Patent
Farr et al.

(10) Patent No.: US 12,265,454 B2
(45) Date of Patent: Apr. 1, 2025

(54) APPLICATION DEPENDENCY BASED MALWARE RECOVERY

(71) Applicant: International Business Machines Corporation, Armonk, NY (US)

(72) Inventors: Erin M Farr, Fishkill, NY (US);
Yu-Cheng Hsu, Tucson, AZ (US);
Pratik Gupta, Wake, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/226,567

(22) Filed: Jul. 26, 2023

(65) Prior Publication Data
US 2025/0036532 A1 Jan. 30, 2025

(51) Int. Cl.
G06F 11/14 (2006.01)
G06F 11/36 (2006.01)
G06F 16/11 (2019.01)

(52) U.S. Cl.
CPC ...... G06F 11/1469 (2013.01); G06F 11/3664 (2013.01); G06F 16/122 (2019.01); G06F 16/128 (2019.01); G06F 2201/84 (2013.01)

(58) Field of Classification Search
CPC ............. G06F 2201/84; G06F 11/1402; G06F 11/1435; G06F 11/1446; G06F 11/1448; G06F 11/1451; G06F 11/1458; G06F 11/1464; G06F 11/1469; G06F 11/3664; G06F 16/122; G06F 16/128; G06F 3/067; G06F 21/55; G06F 21/554; G06F 21/56;
(Continued)

(56) References Cited

U.S. PATENT DOCUMENTS 9,043,651 B2 5/2015 Bala et al.
9,626,252 B1 * 4/2017 Chopra ............... G06F 11/1458
(Continued)

FOREIGN PATENT DOCUMENTS

EP 3491571 B1 5/2021
EP 3623982 B1 5/2021

OTHER PUBLICATIONS

Cloudian, Ransomware Data Recovery: How to Save Your Data, 2023, https://cloudian.com/guides/ransomware-backup/ransomware-data-recovery-5-ways-to-save-your-data/, pp 1-9.
(Continued)

*Primary Examiner* — Robert W Beausoliel, Jr.
*Assistant Examiner* — Cheryl M Shechtman
(74) *Attorney, Agent, or Firm* — Garg Law Firm, PLLC; Rakesh Garg; Michael O'Keefe (57) ABSTRACT

An embodiment identifies a fileset used by an executing application. An embodiment generates, at a first time, a first snapshot of the fileset, the first snapshot comprising a first state of the fileset at the first time and a first indicator corresponding to the first state of the fileset. An embodiment selects, at a recovery time later than the first time, from a sequence of snapshots of the fileset including the first snapshot, a recovery snapshot, the recovery snapshot comprising a recovery indicator, wherein the recovery indicator has a difference from the first indicator that is higher than a threshold value. An embodiment restores, using the recovery snapshot, the fileset to a state other than the first state, the restoring resulting in a restored application.

14 Claims, 7 Drawing Sheets

(58) Field of Classification Search
CPC ...... G06F 21/568; G06F 21/57; G06F 21/577; G06F 2221/034
See application file for complete search history.

(56) References Cited

U.S. PATENT DOCUMENTS

| | | | |
|---|---|---|---|
| 10,178,119 | B1 | 1/2019 | Brandwine et al. |
| 10,769,278 | B2 | 9/2020 | Chelarescu et al. |
| 10,789,361 | B2 | 9/2020 | Breiman et al. |
| 11,030,314 | B2 | 6/2021 | Kucherov et al. |
| 11,151,000 | B2 | 10/2021 | Meadowcroft et al. |
| 11,249,879 | B2 * | 2/2022 | Burgos ................... G06F 11/302 |
| 2012/0130956 | A1 * | 5/2012 | Caputo ............... G06F 11/1469 707/E17.005 |
| 2016/0164918 | A1 | 6/2016 | Satish et al. |
| 2020/0342106 | A1 | 10/2020 | Chelarescu et al. |
| 2020/0349028 | A1 | 11/2020 | Meadowcroft et al. |
| 2021/0049083 | A1 * | 2/2021 | Yakushkin ............. G06N 20/00 |
| 2021/0150025 | A1 | 5/2021 | Ben-Shalom et al. |
| 2021/0152595 | A1 | 5/2021 | Hansen et al. |
| 2021/0216628 | A1 | 7/2021 | Kutner et al. |
| 2021/0382992 | A1 | 12/2021 | Massiglia et al. |
| 2022/0327208 | A1 | 10/2022 | Karr |
| 2022/0374519 | A1 * | 11/2022 | Botelho ............... G06F 11/1464 |
| 2022/0405302 | A1 * | 12/2022 | Grunwald ............. G06F 16/128 |
| 2023/0062383 | A1 | 3/2023 | Borowiec et al. |
| 2023/0141909 | A1 * | 5/2023 | Truscott .................. H04L 63/02 726/23 |
| 2023/0147026 | A1 * | 5/2023 | Munshani ........... G06F 11/1435 714/15 |
| 2023/0177158 | A1 * | 6/2023 | Gee ........................ G06F 21/568 726/22 |
| 2023/0297495 | A1 * | 9/2023 | Kumar ................ G06F 11/1417 714/38.1 |

OTHER PUBLICATIONS

Rubrik, Accelerate Ransomware Recovery, 2023, https://www.rubrik.com/solutions/ransomware-recovery, pp 1-6.

Cloudian, Ransomware Data Recovery: 5 ways to save your data, p. 1-9, 2023, https://cloudian.com/guides/ransomware-backup/ransomware-data-recovery-5-ways-to-save-your-data/.

Cloudian, Ransomware Data Recovery: 5 ways to save your data, 2023, 10 pages, https://web.archive.org/web/20230331085557/https://cloudian.com/guides/ransomware-backup/ransomware-data-recovery-5-ways-to-save-your-data/.

* cited by examiner

APPLICATION DEPENDENCY BASED MALWARE RECOVERY

BACKGROUND

The present invention relates generally to computer application management. More particularly, the present invention relates to a method, system, and computer program for application dependency based malware recovery.

Malware is software intentionally designed to cause disruption to a computer system, expose private information, gain unauthorized access to a computer system, deprive access to information stored on a computer system, or cause a computer system to perform another unauthorized or undesirable function. Some malware corrupts or erases data stored in a computer's file system, either temporarily or permanently. Ransomware is a type of malware that renders a victim system's files inaccessible (often via encryption) and demands a ransom payment from a victim to render the files accessible once more. Recovery from a file system attack, such as ransomware (if the ransom is not paid or a suitable decryption is not supplied), typically includes restoring files in the file system from backups that were unaffected by the attack. A malware attack can often go undetected for weeks or months, as the malware gains access to a portion of a computer system or network and uses the accessible portion to gain additional access to other portions, before finally doing sufficient damage to system functionality that the attack is detected. Recovery from a malware attack (i.e., malware recovery) typically includes reinstalling software and applications, restoring functionality from backup copies of applications and data, or a combination. File system disruptions can also occur for reasons other than a malware attack (e.g., a natural disaster or equipment failure), but recovery operations are similar, typically including reinstalling software and applications, restoring functionality from backup copies of applications and data, or a combination.

In computing, and as used herein, a workload is a program or application that executes on a computer system. A workload might be one application executing on a single computer system (e.g., a single instance of a word processing application), or an application divided into services or microservices, each executing a portion of a distributed application on different computer systems and communicating with each other via a network. An application has one or more dependencies, i.e., resources the application depends on to operate. For example, an application's dependencies might include a software library including functions used by application code, a service or microservice performing transactions for the application, a storage capability in which the application stores data, a system on which the application executes, and the like.

SUMMARY

The illustrative embodiments provide for application dependency based malware recovery. An embodiment includes identifying a fileset used by an executing application. An embodiment includes generating, at a first time, a first snapshot of the fileset, the first snapshot comprising a first state of the fileset at the first time and a first indicator corresponding to the first state of the fileset. An embodiment includes selecting, at a recovery time later than the first time, from a sequence of snapshots of the fileset including the first snapshot, a recovery snapshot, the recovery snapshot comprising a recovery indicator, wherein the recovery indicator has a difference from the first indicator that is higher than a threshold value. An embodiment includes restoring, using the recovery snapshot, the fileset to a state other than the first state, the restoring resulting in a restored application. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

The illustrative embodiments recognize that, because a malware attack can often go undetected for a period of time, after a malware attack determining which backup copies of data are unaffected by the attack (and hence usable to recover from) is a manual and time-consuming process that can often take months. System administrators performing the recovery typically proceed one computer system or file system at a time, guessing at when the attack began to affect particular backups and without regard for which file systems include components of which applications. Thus, it is difficult to identify components of business-critical applications and restore such applications to function before components of less critical applications. As a result, the illustrative embodiments recognize that there is a need to automatically identify and recover application components according to a priority assigned to an application.

The present disclosure addresses the deficiencies described above by providing a process (as well as a system, method, machine-readable medium, etc.) that identifies a fileset used by an executing application, generates a sequence of snapshots of the fileset, each snapshot comprising a state of the fileset at a time and an indicator corresponding to the state of the fileset at the time, selecting a recovery snapshot from the sequence of snapshots of the fileset, and using the recovery snapshot to restore the fileset to an previous state. Thus, the illustrative embodiments provide for application dependency based malware recovery.

An embodiment receives priority data identifying one or more business workloads and each workload's recovery priority. A business workload includes one or more applications. A workload's recovery priority indicates a recovery order (e.g., workload 1 first, workload 2 second, etc.), a recovery priority category (e.g., all workloads in category 1 first, then all workloads in category 2, etc.), a workload category associated with a corresponding recovery priority category (e.g., all workloads in the "finance" category are category 1), or another recovery priority scheme. One embodiment stores workload information, including both priority and any applications associated with a workload, in a policy file or database.

An embodiment uses execution data of an executing application in an identified business workload to identify one or more of the application's service and storage dependencies, as well as one or more hosts the application uses. Some non-limiting examples of an application's service dependencies include which services or other applications the application transacts with, both as a user and a service provider. For example, a credit card processing application might supply credit card processing services to a shopping application, and use an address validation application to validate credit card data during processing. Some non-limiting examples of an application's storage dependencies include which file system clusters (if using a clustered file system), storage volumes (if using a file system that uses storage volumes), and files the application reads from, writes to, or that store application code. Some non-limiting examples of an application's hosts include physical computer systems, virtual machines, and containers (packages of application software that include everything an application needs to run, including code, dependencies, libraries, and binaries). Techniques are presently available to identify an application's service and storage dependencies and hosts, as part of a computing resource management system or a cloud environment management system such as Kubernetes or Turbonomic. (Kubernetes is a registered trademark of The Linux Foundation in the United States and other countries. Turbonomic is a registered trademark of International Business Machines Corporation in the United States and other countries.) One embodiment constructs a dependency graph of a workload or application. A dependency graph represents an application's identified service and storage dependencies, as well as hosts the application uses, in a graph in which edges represent dependencies and other relationships between entities represented by nodes.

An embodiment monitors the services, storage, and hosts an application depends on to identify a fileset an application uses during application execution. A fileset includes one or more files that will be recovered together. Each file in a fileset need not be named individually, but instead the fileset may refer to all files in a directory, folder, storage volume, or other file system grouping. One embodiment identifies more than one fileset, and groups files into filesets using an organization or granularity that is convenient for fileset restoration. For example, an embodiment might group an application's files into filesets according to their storage volume, file system or data center in which the files are stored. One embodiment stores fileset organization or granularity information in a policy file or database.

An embodiment periodically generates and stores a snapshot of a fileset. Each snapshot includes sufficient data to recover the files in a fileset, in the event of a ransomware attack or other file system disruption affecting the fileset. To generate a snapshot, an embodiment uses a presently available technique, such as the mmersnapshot command in General Parallel File System (GPFS, a clustered file system management software implementation). Similar snapshot implementations are available in other presently available file system management implementations. In some snapshot implementations, snapshots are not changeable after generation. Other snapshot implementations are configurable to allow or prevent changes to generated snapshots.

A snapshot also includes an indicator usable to detect whether a particular snapshot might be affected by a file system disruption. In one embodiment, the indicator is binary (either the snapshot is presumed affected or unaffected by the file system disruption), but other indicator schemes are also possible and contemplated within the scope of the illustrative embodiments. One embodiment sets a snapshot's indicator to the "affected" state if the embodiment detects that specific files in the snapshot are encrypted or that above a threshold number of files are encrypted (indicating a possible ransomware attack). Another embodiment sets a snapshot's indicator to the "affected" state if the embodiment detects that bulk actions (such as files being modified or changing size) on above a threshold number of files have occurred (indicating a possible malware attack). Another embodiment sets a snapshot's indicator to the "affected" state if the embodiment detects a greater-than-a-threshold change in the number of files in a fileset. Another embodiment sets a snapshot's indicator to the "affected" state if the embodiment detects that one or more files in a fileset no longer match their file extension. For example, the embodiment might test that the file "sample.pdf" meets the specification of a portable document format (PDF) file. Another embodiment sets a snapshot's indicator to the "affected" state if the embodiment detects presently available Indicators of Compromise (IOCs), known patterns resulting from malware, or specific malware variants, in one or more files in a fileset. Another embodiment sets a snapshot's indicator to the "affected" state if the embodiment detects, for example in domain name system (DNS) and network connection logs, presently available patterns of network activity indicative of the presence of malware around the time a snapshot was generated. Another embodiment sets a snapshot's indicator to a timestamp of the snapshot. Other indicators are also possible and contemplated within the scope of the illustrative embodiments.

Snapshots and their indicators form a sequence, in which older snapshots have indicators that are presumed unaffected by a malware attack or other file system disruption, and indicator changes in newer snapshots might indicate that a particular snapshot has been affected by a disruption. Thus, to recover from a file system disruption detected using a presently available technique, an embodiment generates a snapshot and corresponding indicator representing a current state of the file system, and searches backwards in time through stored snapshots and their indicators until an indicator sufficiently different from a current snapshot's indicator is found. One embodiment selects the snapshot with the sufficiently different indicator as a recovery snapshot. In one embodiment implementing a binary indicator, an indicator sufficiently different from a current snapshot's indicator is an indicator in the opposite state from the current indicator. For example, if the current indicator is the "affected" state, a sufficiently different indicator is the "unaffected" state. In another embodiment, an indicator sufficiently different from a current snapshot's indicator is an indicator that has a difference from the current snapshot's indicator that is higher than a threshold value. Another embodiment selects, as a recovery snapshot, a snapshot generated at a time with above a threshold probability of being earlier than an estimated starting point of the file system disruption. For example, if snapshots at 10 AM on Tuesday have a 70% probability of being unaffected by the disruption, but the snapshots from 2 AM earlier that same Tuesday have a 90% probability of being unaffected by the disruption, an embodiment might select the older (2 AM) snapshots as the recovery snapshot. Another embodiment using timestamps as indicators searches backwards in time through stored snapshots and their indicators until a snapshot timestamp that is earlier than a known or presumed starting time of a file system disruption is found.

One embodiment begins the search at a snapshot generated at the present time (after a file system disruption has been detected and recovery is in progress). Another embodiment begins the search at a snapshot generated at a time before which the file system disruption was detected. Another embodiment begins the search at a snapshot generated at a time before a known starting point of the file system disruption. The known starting point can be determined using a presently available technique, such as examining connections to a known malware control server, as logged in a system's network communication log. Other search starting points are also possible and contemplated within the scope of the illustrative embodiments.

One embodiment uses the recovery snapshot to restore the fileset into a production environment, resulting in a restored application. Restoring directly into a production environment assumes that the recovery snapshot is unaffected by a file system disruption and that, once restored, the restored application will execute normally in the production environment.

Another embodiment uses the recovery snapshot to restore the fileset into a test environment, resulting in a restored application, and tests that the restored application meets a test success criterion, indicating that the restored application is executing correctly in the test environment. If the application does not meet a test success criterion using the selected recovery snapshot, an embodiment repeats the restoration and testing with a recovery snapshot further back in time, and repeats the selection and testing until arriving at a recovery snapshot with which the application does meet a test success criterion. One embodiment notifies a human to validate the restored application, either instead of or in conjunction with the embodiment's recovery snapshot selection and testing. An embodiment uses a recovery snapshot that has been validated in a test environment to restore the fileset into a production environment, resulting in a restored application executing in the production environment.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
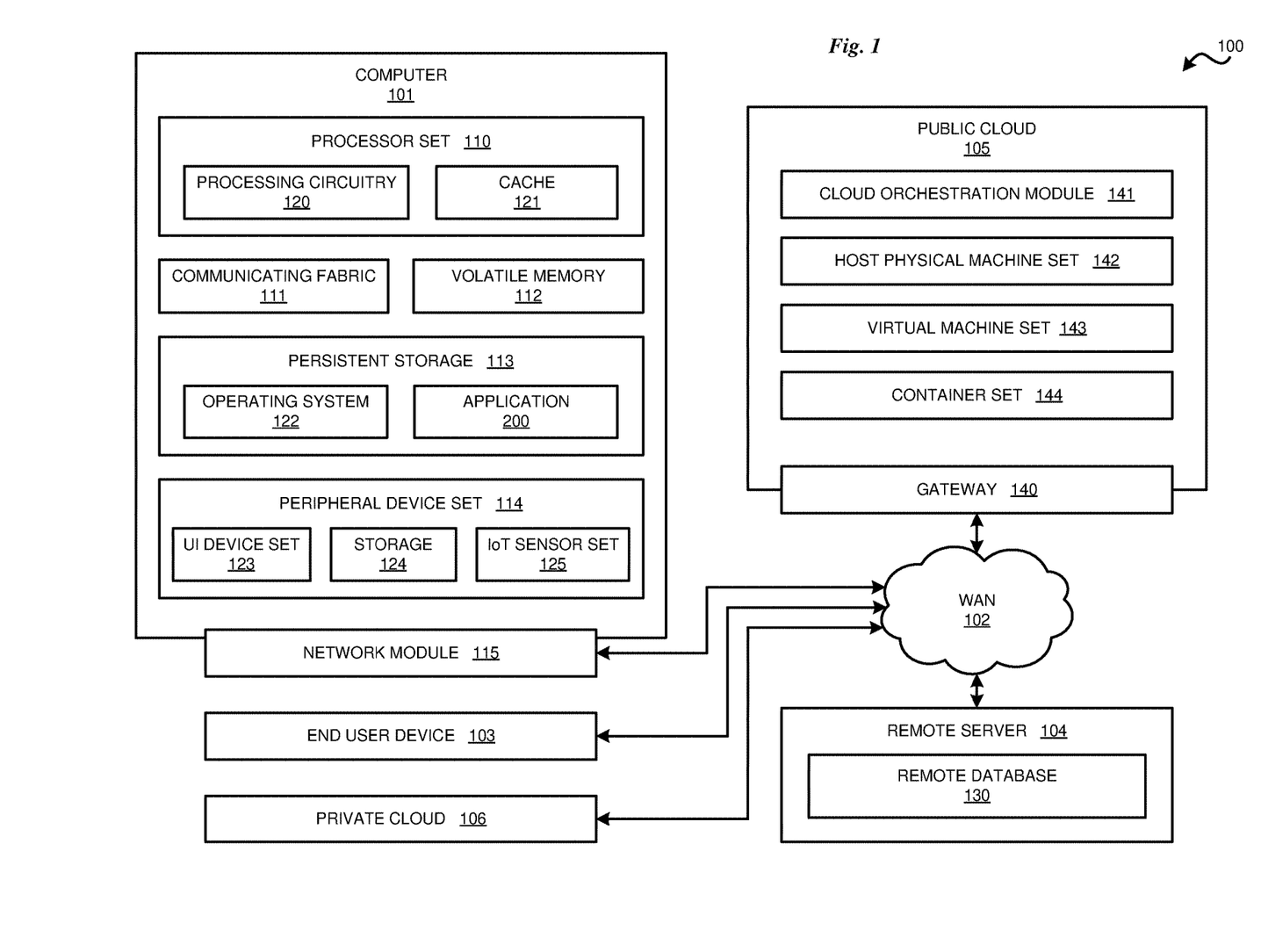
FIG. 1 depicts a block diagram of a computing environment in accordance with an illustrative embodiment.

With reference to FIG. 1, this figure depicts a block diagram of a computing environment 100. Computing environment 100 contains an example of an environment for the execution of at least some of the computer code involved in performing the inventive methods, such as an application 200 that provides application dependency based malware recovery. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
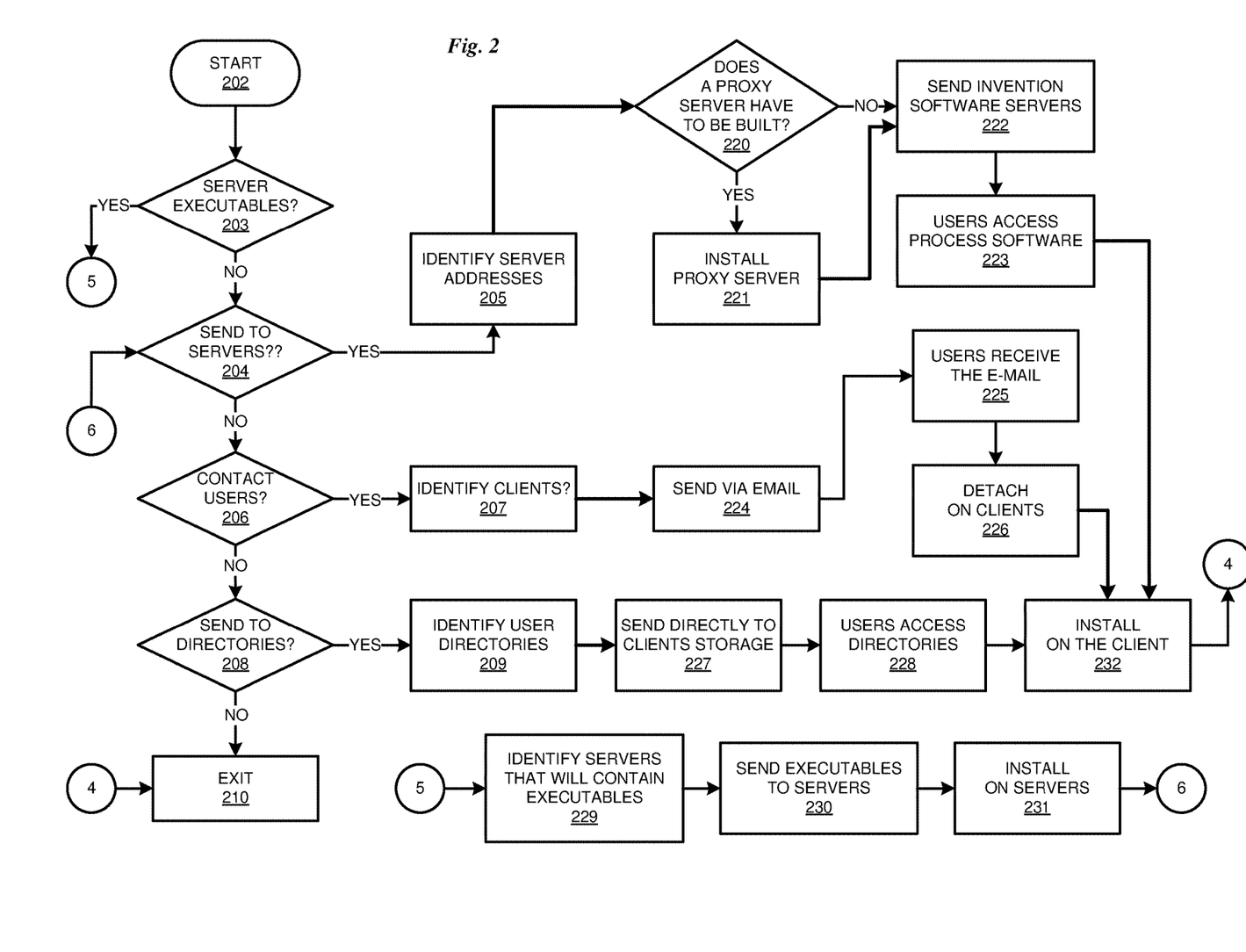
FIG. 2 depicts a flowchart of an example process for loading of process software in accordance with an illustrative embodiment.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing application dependency based malware recovery may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

Figure 3:
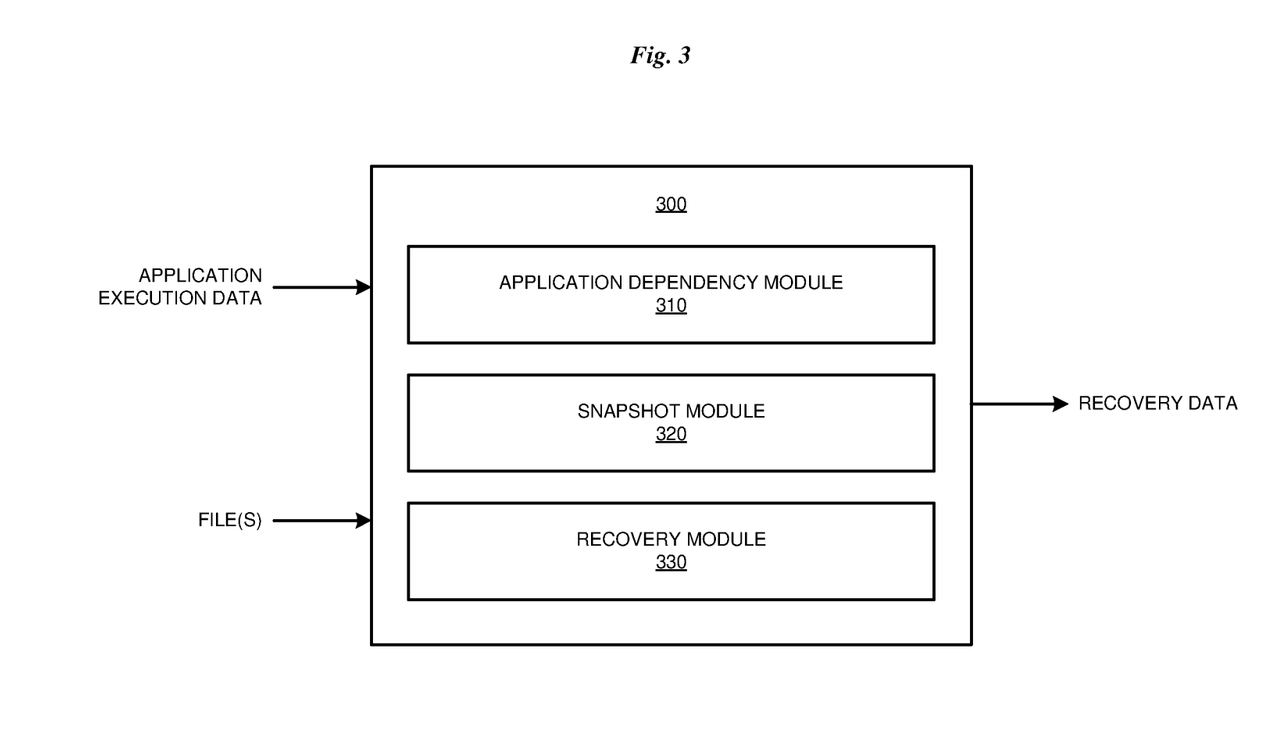
FIG. 3 depicts a block diagram of an example configuration for application dependency based malware recovery in accordance with an illustrative embodiment.

With reference to FIG. 3, this figure depicts a block diagram of an example configuration for application dependency based malware recovery in accordance with an illustrative embodiment. Application 300 is the same as application 200 in FIG. 1.

In the illustrated embodiment, application 300 receives priority data identifying one or more business workloads and each workload's recovery priority. A business workload includes one or more applications. A workload's recovery priority indicates a recovery order (e.g., workload 1 first, workload 2 second, etc.), a recovery priority category (e.g., all workloads in category 1 first, then all workloads in category 2, etc.), a workload category associated with a corresponding recovery priority category (e.g., all workloads in the "finance" category are category 1), or another recovery priority scheme. One implementation of application 300 stores workload information, including both priority and any applications associated with a workload, in a policy file or database.

Application dependency module 310 uses execution data of an executing application in an identified business workload to identify one or more of the application's service and storage dependencies, as well as one or more hosts the application uses. Some non-limiting examples of an application's service dependencies include which services or other applications the application transacts with, both as a user and a service provider. For example, a credit card processing application might supply credit card processing services to a shopping application, and use an address validation application to validate credit card data during processing. Some non-limiting examples of an application's storage dependencies include which file system clusters (if using a clustered file system), storage volumes (if using a file system that uses storage volumes), and files the application reads from, writes to, or that store application code. Some non-limiting examples of an application's hosts include physical computer systems, virtual machines, and containers (packages of application software that include everything an application needs to run, including code, dependencies, libraries, and binaries). Techniques are presently available to identify an application's service and storage dependencies and hosts, as part of a computing resource management system or a cloud environment management system such as Kubernetes or Turbonomic. One implementation of module 310 constructs a dependency graph of a workload or application. A dependency graph represents an application's identified service and storage dependencies, as well as hosts the application uses, in a graph in which edges represent dependencies and other relationships between entities represented by nodes.

Module 310 monitors the services, storage, and hosts an application depends on to identify a fileset an application uses during application execution. A fileset includes one or more files that will be recovered together. Each file in a fileset need not be named individually, but instead the fileset may refer to all files in a directory, folder, storage volume, or other file system grouping. One implementation of module 310 identifies more than one fileset, and groups files into filesets using an organization or granularity that is convenient for fileset restoration. For example, module 310 might group an application's files into filesets according to their storage volume, file system or data center in which the files are stored. One embodiment stores fileset organization or granularity information in a policy file or database.

Snapshot module 320 periodically generates and stores a snapshot of a fileset. Each snapshot includes sufficient data to recover the files in a fileset, in the event of a ransomware attack or other file system disruption affecting the fileset. To generate a snapshot, module 320 uses a presently available technique, such as the mmersnapshot command in GPFS. Similar snapshot implementations are available in other presently available file system management implementations. Snapshots are not changeable after generation.

A snapshot also includes an indicator usable to detect whether a particular snapshot might be affected by a file system disruption. In one implementation of module 320, the indicator is binary (either the snapshot is presumed affected or unaffected by the file system disruption), but other indicator schemes are also possible and contemplated within the scope of the illustrative embodiments. One implementation of module 320 sets a snapshot's indicator to the "affected" state if module 320 detects that specific files in the snapshot are encrypted or that above a threshold number of files are encrypted (indicating a possible ransomware attack). Another implementation of module 320 sets a snapshot's indicator to the "affected" state if module 320 detects that bulk actions (such as files being modified or changing size) on above a threshold number of files have occurred (indicating a possible malware attack). Another implementation of module 320 sets a snapshot's indicator to the "affected" state if module 320 detects a greater-than-a-threshold change in the number of files in a fileset. Another implementation of module 320 sets a snapshot's indicator to the "affected" state if module 320 detects that one or more files in a fileset no longer match their file extension. For example, module 320 might test that the file "sample.pdf" meets the specification of a portable document format (PDF) file. Another implementation of module 320 sets a snapshot's indicator to the "affected" state if module 320 detects presently available Indicators of Compromise (IOCs), known patterns resulting from malware, or specific malware variants, in one or more files in a fileset. Another implementation of module 320 sets a snapshot's indicator to the "affected" state if module 320 detects, for example in domain name system (DNS) and network connection logs, presently available patterns of network activity indicative of the presence of malware around the time a snapshot was generated. Another implementation of module 320 sets a snapshot's indicator to a timestamp of the snapshot. Other indicators are also possible.

Snapshots and their indicators form a sequence, in which older snapshots have indicators that are presumed unaffected by a malware attack or other file system disruption, and indicator changes in newer snapshots might indicate that a particular snapshot has been affected by a disruption. Thus, to recover from a file system disruption detected using a presently available technique, recovery module 330 generates a snapshot and corresponding indicator representing a current state of the file system, and searches backwards in time through stored snapshots and their indicators until an indicator sufficiently different from a current snapshot's indicator is found. One implementation of module 330 selects the snapshot with the sufficiently different indicator as a recovery snapshot. In one implementation of module 330 implementing a binary indicator, an indicator sufficiently different from a current snapshot's indicator is an indicator in the opposite state from the current indicator. For example, if the current indicator is the "affected" state, a sufficiently different indicator is the "unaffected" state. In another implementation of module 330, an indicator sufficiently different from a current snapshot's indicator is an indicator that has a difference from the current snapshot's indicator that is higher than a threshold value. Another implementation of module 330 selects, as a recovery snapshot, a snapshot generated at a time with above a threshold probability of being earlier than an estimated starting point of the file system disruption. For example, if snapshots at 10 AM on Tuesday have a 70% probability of being unaffected by the disruption, but the snapshots from 2 AM earlier that same Tuesday have a 90% probability of being unaffected by the disruption, an embodiment might select the older (2 AM) snapshots as the recovery snapshot. Another implementation of module 330 using timestamps as indicators searches backwards in time through stored snapshots and their indicators until a snapshot timestamp that is earlier than a known or presumed starting time of a file system disruption is found.

One implementation of module 330 begins the search at a snapshot generated at the present time (after a file system disruption has been detected and recovery is in progress). Another implementation of module 330 begins the search at a snapshot generated at a time before which the file system disruption was detected. Another implementation of module 330 begins the search at a snapshot generated at a time before a known starting point of the file system disruption. The known starting point can be determined using a presently available technique, such as examining connections to a known malware control server, as logged in a system's network communication log. Other search starting points are also possible.

One implementation of module 330 uses the recovery snapshot to restore the fileset into a production environment, resulting in a restored application. Restoring directly into a production environment assumes that the recovery snapshot is unaffected by a file system disruption and that, once restored, the restored application will execute normally in the production environment.

Another implementation of module 330 uses the recovery snapshot to restore the fileset into a test environment, resulting in a restored application, and tests that the restored application meets a test success criterion, indicating that the restored application is executing correctly in the test environment. If the application does not meet a test success criterion using the selected recovery snapshot, module 330 repeats the restoration and testing with a recovery snapshot further back in time, and repeats the selection and testing until arriving at a recovery snapshot with which the application does meet a test success criterion. One implementation of module 330 notifies a human to validate the restored application, either instead of or in conjunction with module 330's recovery snapshot selection and testing. One implementation of module 330 uses a recovery snapshot that has been validated in a test environment to restore the fileset into a production environment, resulting in a restored application executing in the production environment.

Figure 4:
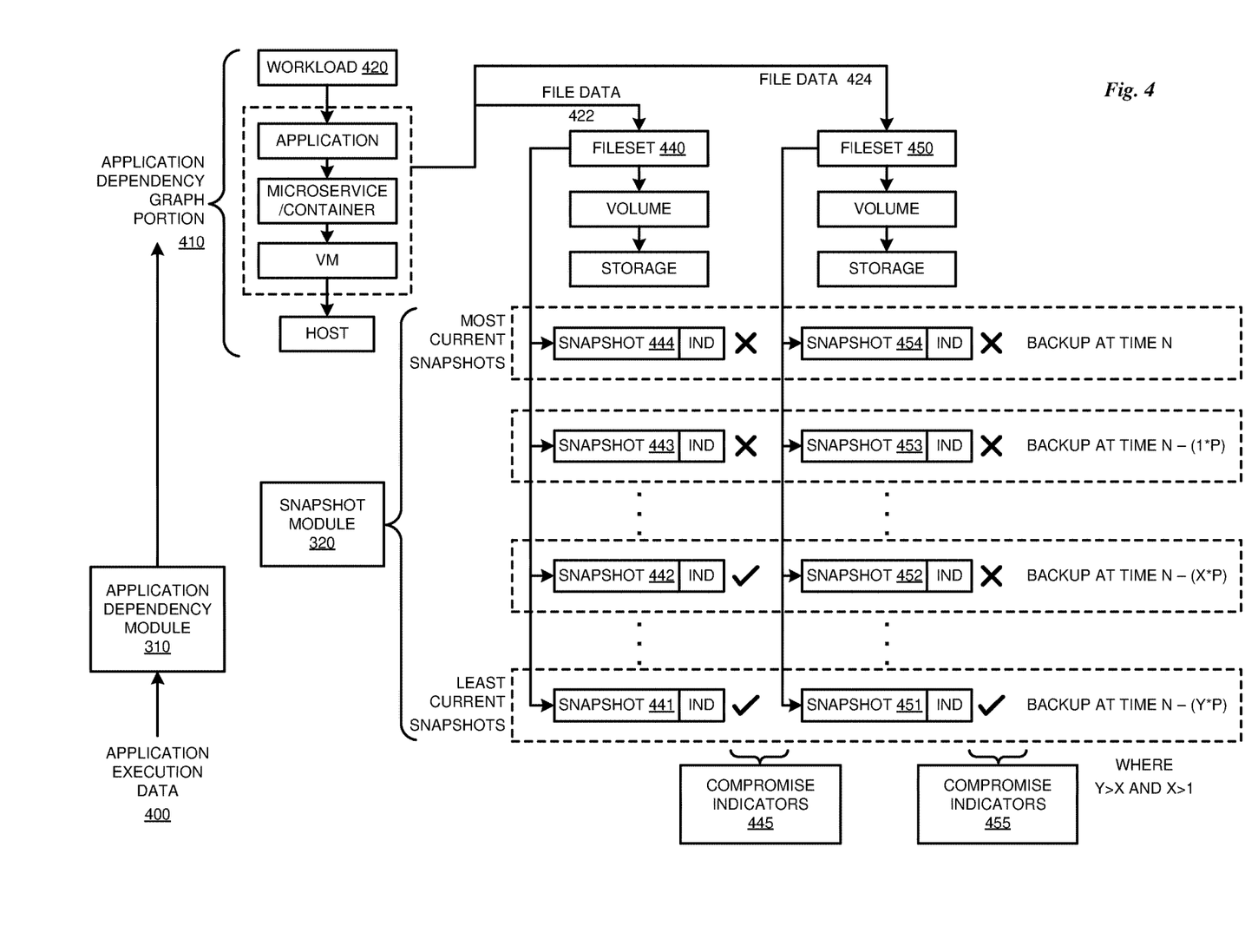
FIG. 4 depicts an example of application dependency based malware recovery in accordance with an illustrative embodiment.

With reference to FIG. 4, this figure depicts an example of application dependency based malware recovery in accordance with an illustrative embodiment. The example can be executed using application 300 in FIG. 3. Application dependency module 310 and snapshot module 320 are the same as application dependency module 310 and snapshot module 320 in FIG. 3.

As depicted, application dependency module 310 uses application execution data 400, execution data of an executing application in an identified business workload, to identify one or more of the application's service and storage dependencies, as well as one or more hosts the application uses. The results are depicted in application dependency graph portion 410, including components of workload 420. Workload 420 generates file data 422 to one or more files in fileset 440, and generates file data 424 to one or more files in fileset 450.

Snapshot module 320 periodically (at every time period P) generates and stores snapshots, such as snapshots 441, 442, 443, and 444 of fileset 440 and snapshots 451, 452, 453, and 454 of fileset 450. Snapshots 441, 442, 443, and 444 each include an indicator in indicators 445, and snapshots 451, 452, 453, and 454 each include an indicator in compromise indicators 455.

Figure 5:
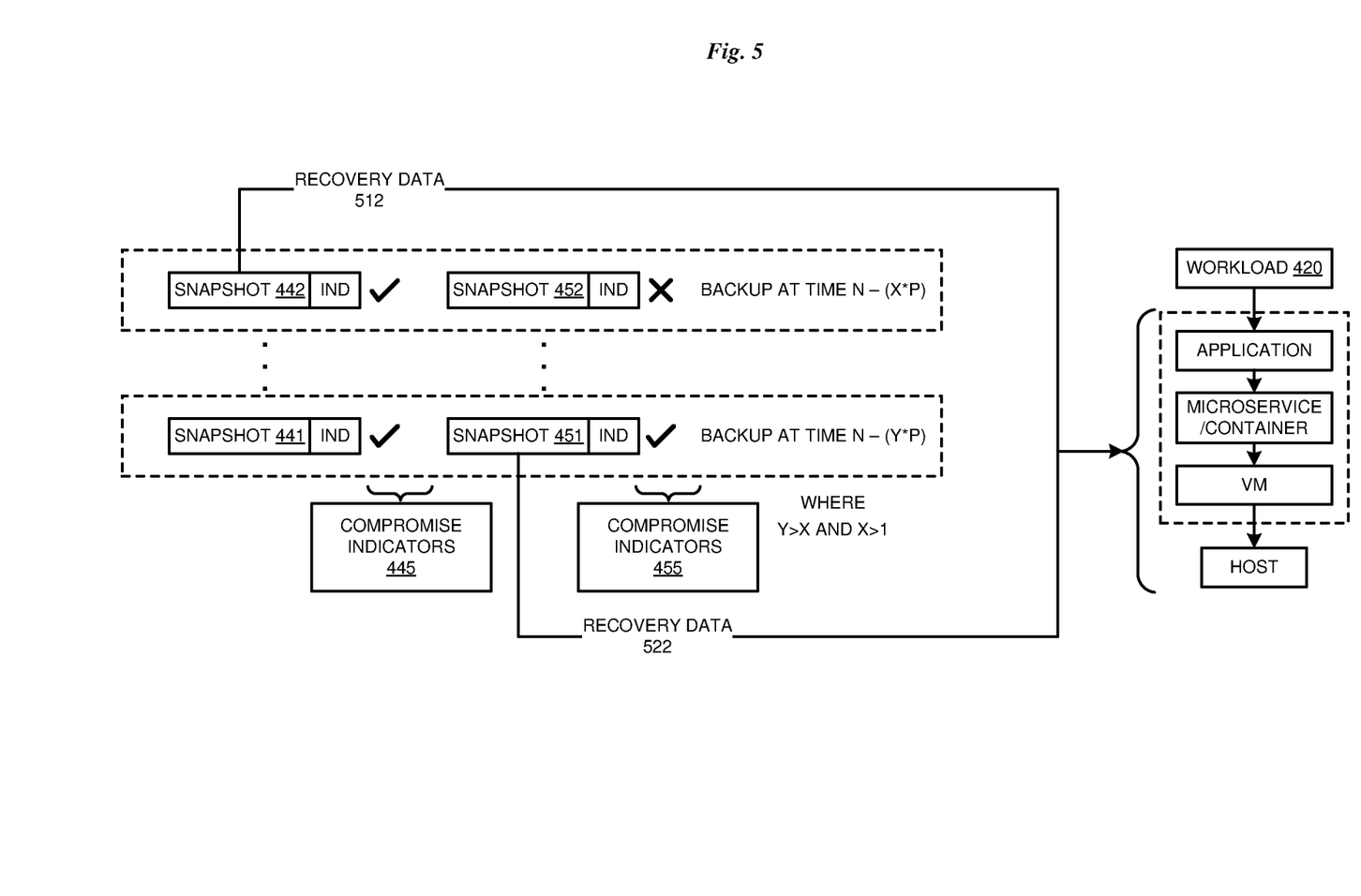
FIG. 5 depicts a continued example of application dependency based malware recovery in accordance with an illustrative embodiment.

With reference to FIG. 5, this figure depicts a continued example of application dependency based malware recovery in accordance with an illustrative embodiment. Snapshots 441, 442, 451, and 452, compromise indicators 445 and 455, and workload 420 are the same as snapshots 441, 442, 451, and 452, compromise indicators 445 and 455, and workload 420 in FIG. 4.

As depicted, recovery module 330 has searched backwards in time through stored snapshots and their indicators until an indicator sufficiently different from a current snapshot's indicator is found. For fileset 440, snapshot 442 is the most recent snapshot with an indicator sufficiently different from snapshot 444's (the current snapshot's) indicator. Thus, snapshot 442 is used as recovery data 512 to restore workload 420. For fileset 450, snapshot 451 is the most recent snapshot with an indicator sufficiently different from snapshot 454's (the current snapshot's) indicator. Thus, snapshot 451 is used as recovery data 522 to restore workload 420.

Figure 6:
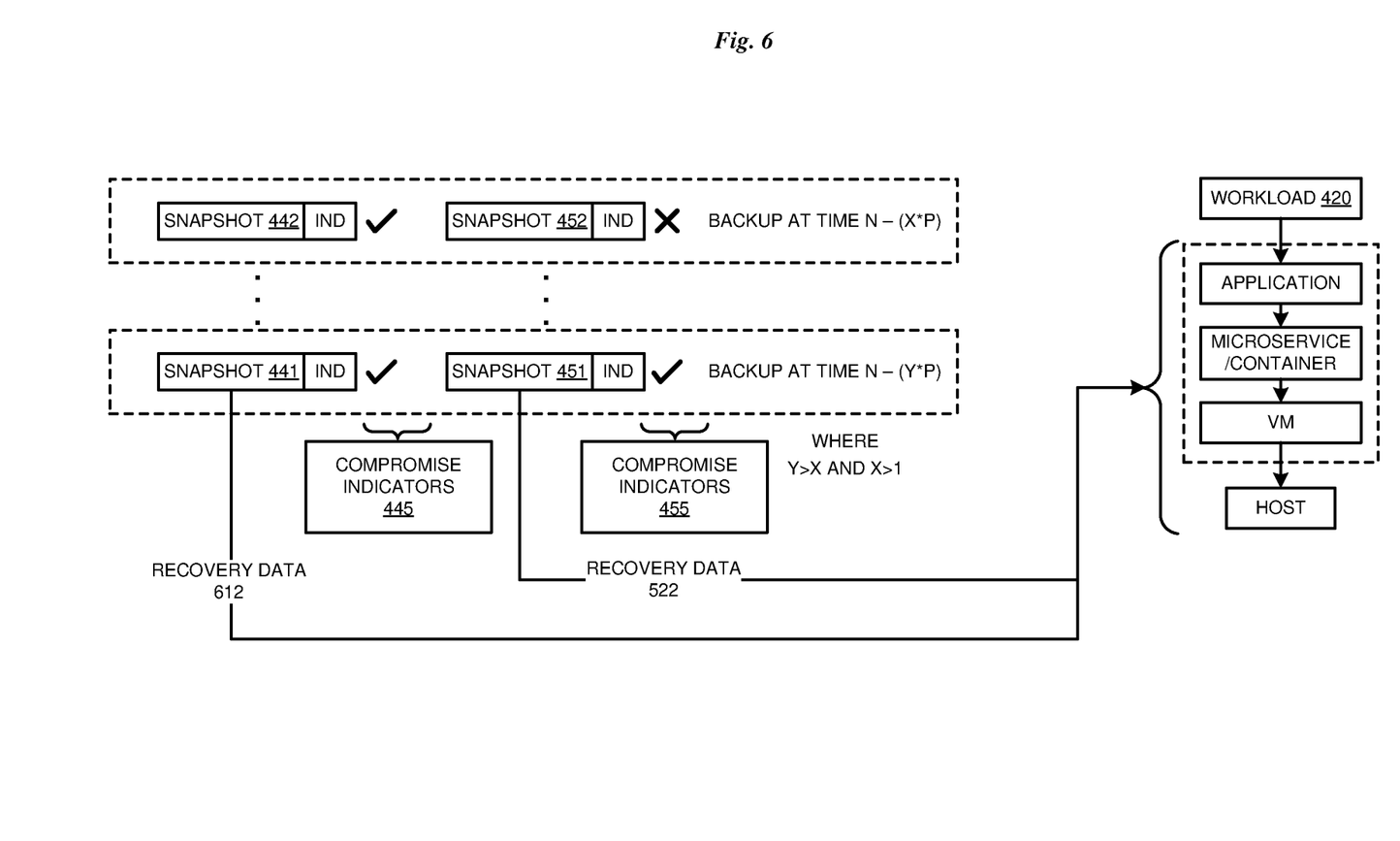
FIG. 6 depicts a continued example of application dependency based malware recovery in accordance with an illustrative embodiment.

With reference to FIG. 6, this figure depicts a continued example of application dependency based malware recovery in accordance with an illustrative embodiment. Snapshots 441, 442, 451, and 452, compromise indicators 445 and 455, and workload 420 are the same as snapshots 441, 442, 451, and 452, compromise indicators 445 and 455, and workload 420 in FIG. 4. Recovery data 522 is the same as recovery data 522 in FIG. 5.

In particular, FIG. 6 depicts actions after workload 420, restored from recovery data 512 and 522, has been tested and does not meet a test success criterion. Thus, module 330 repeats the restoration and testing with snapshot 441 instead of snapshot 442, generating recovery data 612. Snapshot 441 is a recovery snapshot further back in time than snapshot 442, so is less likely to have been affected by a file system disruption than snapshot 442.

Figure 7:
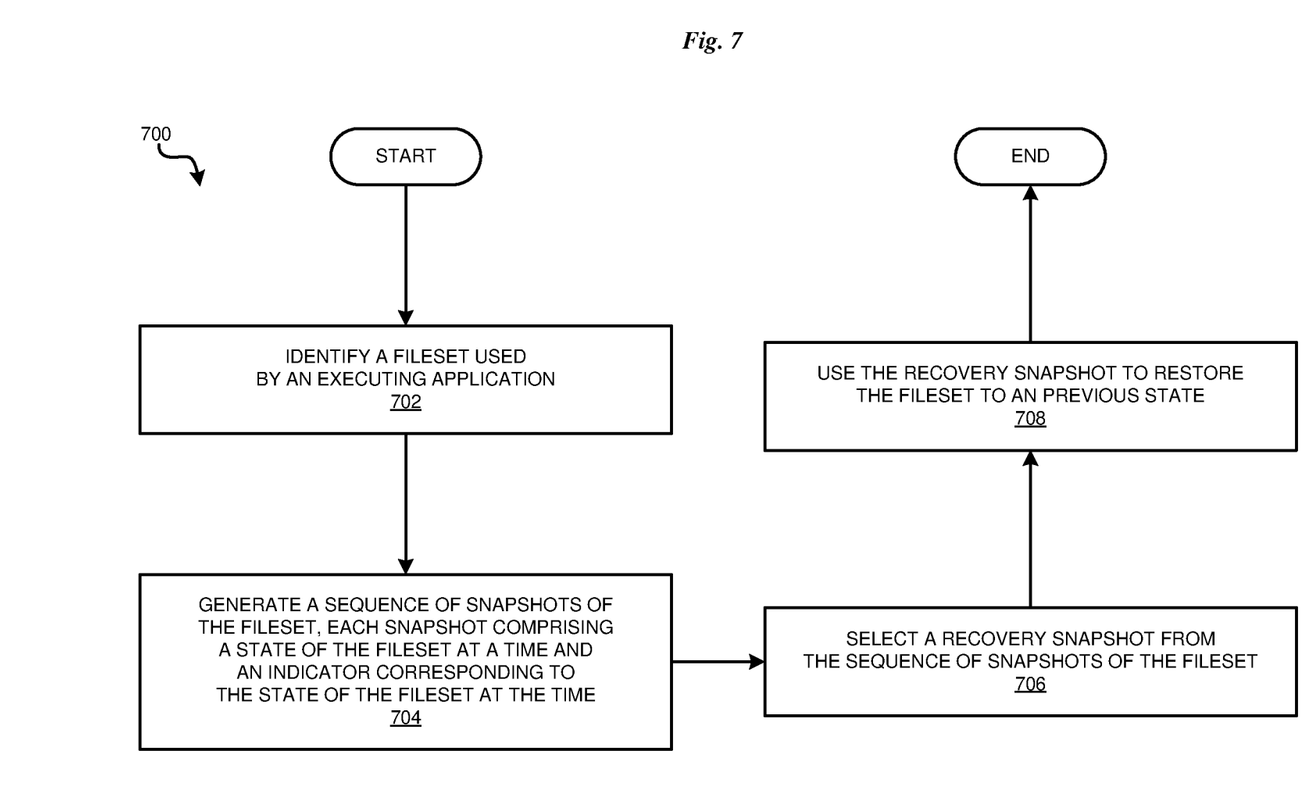
FIG. 7 depicts a flowchart of an example process for application dependency based malware recovery in accordance with an illustrative embodiment.

With reference to FIG. 7, this figure depicts a flowchart of an example process for application dependency based malware recovery in accordance with an illustrative embodiment. Process 700 can be implemented in application 300 in FIG. 3.

In the illustrated embodiment, at block 702, the process 702 identifies a fileset used by an executing application. At block 704, the process generates a sequence of snapshots of the fileset, each snapshot comprising a state of the fileset at a time and an indicator corresponding to the state of the fileset at the time. At block 706, the process selects a recovery snapshot from the sequence of snapshots of the fileset. At block 708, the process uses the recovery snapshot to restore the fileset to a previous state. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (Saas) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   identifying a fileset used by an executing application;
   generating, at a first time, a first snapshot of the fileset, the first snapshot comprising a first state of the fileset at the first time and a first indicator corresponding to the first state of the fileset;
   selecting, at a recovery time later than the first time, from a sequence of snapshots of the fileset including the first snapshot, a recovery snapshot, the recovery snapshot comprising a recovery indicator, wherein the recovery indicator has a difference from the first indicator that is higher than a threshold value;
   restoring, using the recovery snapshot, the fileset to a state other than the first state, the restoring resulting in a restored application;
   testing the restored application, the testing comprising executing the restored application in a test environment;
   determining that the restored application does not meet a test success criterion;
   selecting, from the sequence of snapshots of the fileset including the first snapshot, a second recovery snapshot, wherein the recovery snapshot was generated at a second time, wherein the second recovery snapshot was generated at a third time earlier than the second time;
   restoring, using the second recovery snapshot, the fileset to a state other than the first state, the restoring using the second recovery snapshot resulting in a second restored application; and
   retesting the second restored application, the retesting comprising executing the second restored application in the test environment.

2. The computer-implemented method of claim 1, wherein the first indicator comprises an encryption state of the fileset.

3. The computer-implemented method of claim 1, wherein the first indicator comprises a bulk action state of the fileset.

4. The computer-implemented method of claim 1, further comprising:

determining that the restored application meets a test success criterion; and executing, in a production environment, the restored application.

5. A computer program product comprising one or more computer readable storage media, and program instructions collectively stored on the one or more computer readable storage media, the program instructions executable by a processor to cause the processor to perform operations comprising:

identifying a fileset used by an executing application;

generating, at a first time, a first snapshot of the fileset, the first snapshot comprising a first state of the fileset at the first time and a first indicator corresponding to the first state of the fileset;

selecting, at a recovery time later than the first time, from a sequence of snapshots of the fileset including the first snapshot, a recovery snapshot, the recovery snapshot comprising a recovery indicator, wherein the recovery indicator has a difference from the first indicator that is higher than a threshold value;

restoring, using the recovery snapshot, the fileset to a state other than the first state, the restoring resulting in a restored application;

testing the restored application, the testing comprising executing the restored application in a test environment;

determining that the restored application does not meet a test success criterion;

selecting, from the sequence of snapshots of the fileset including the first snapshot, a second recovery snapshot, wherein the recovery snapshot was generated at a second time, wherein the second recovery snapshot was generated at a third time earlier than the second time;

restoring, using the second recovery snapshot, the fileset to a state other than the first state, the restoring using the second recovery snapshot resulting in a second restored application; and retesting the second restored application, the retesting comprising executing the second restored application in the test environment.

6. The computer program product of claim 5, wherein the stored program instructions are stored in a computer readable storage device in a data processing system, and wherein the stored program instructions are transferred over a network from a remote data processing system.

7. The computer program product of claim 5, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

8. The computer program product of claim 5, wherein the first indicator comprises an encryption state of the fileset.

9. The computer program product of claim 5, wherein the first indicator comprises a bulk action state of the fileset.

10. The computer program product of claim 5, further comprising:

determining that the restored application meets a test success criterion; and executing, in a production environment, the restored application.

11. A computer system comprising a processor and one or more computer readable storage media, and program instructions collectively stored on the one or more computer readable storage media, the program instructions executable by the processor to cause the processor to perform operations comprising:

identifying a fileset used by an executing application;

generating, at a first time, a first snapshot of the fileset, the first snapshot comprising a first state of the fileset at the first time and a first indicator corresponding to the first state of the fileset;

selecting, at a recovery time later than the first time, from a sequence of snapshots of the fileset including the first snapshot, a recovery snapshot, the recovery snapshot comprising a recovery indicator, wherein the recovery indicator has a difference from the first indicator that is higher than a threshold value;

restoring, using the recovery snapshot, the fileset to a state other than the first state, the restoring resulting in a restored application;

testing the restored application, the testing comprising executing the restored application in a test environment;

determining that the restored application does not meet a test success criterion;

selecting, from the sequence of snapshots of the fileset including the first snapshot, a second recovery snapshot, wherein the recovery snapshot was generated at a second time, wherein the second recovery snapshot was generated at a third time earlier than the second time;

restoring, using the second recovery snapshot, the fileset to a state other than the first state, the restoring using the second recovery snapshot resulting in a second restored application; and retesting the second restored application, the retesting comprising executing the second restored application in the test environment.

12. The computer system of claim 11, wherein the first indicator comprises an encryption state of the fileset.

13. The computer system of claim 11, wherein the first indicator comprises a bulk action state of the fileset.

14. The computer system of claim 11, further comprising:

determining that the restored application meets a test success criterion; and executing, in a production environment, the restored application.

* * * * *